US007768658B2

(12) United States Patent
Tsai et al.

(10) Patent No.: US 7,768,658 B2
(45) Date of Patent: Aug. 3, 2010

(54) ANOMALY DETECTION SYSTEM AND METHOD

(75) Inventors: Ya-Hui Tsai, Taoyuan County (TW); Tung-Chuan Wu, Hsinchu (TW); Chun-Hsien Liu, Taipei (TW)

(73) Assignee: Industrial Technology Research Institute, Hsin-Chu (TW)

( * ) Notice: Subject to any disclaimer, the term of this patent is extended or adjusted under 35 U.S.C. 154(b) by 373 days.

(21) Appl. No.: 11/839,507

(22) Filed: Aug. 15, 2007

(65) Prior Publication Data

US 2008/0300816 A1 Dec. 4, 2008

(30) Foreign Application Priority Data

May 29, 2007 (TW) .............................. 96119068 A

(51) Int. Cl.
*G01B 11/14* (2006.01)

(52) U.S. Cl. ...................................... 356/614; 356/620

(58) Field of Classification Search ................. 356/601, 356/614–623, 603
See application file for complete search history.

(56) References Cited

U.S. PATENT DOCUMENTS 5,973,788 A * 10/1999 Pettersen et al. ............ 356/614
7,085,622 B2 * 8/2006 Sadighi et al. .............. 700/245
7,180,607 B2 * 2/2007 Kyle et al. .................. 356/614
2004/0080758 A1 * 4/2004 Ban et al. .................. 356/603
2004/0136012 A1 * 7/2004 Kyle et al. .................. 356/614
2005/0270486 A1 * 12/2005 Teiwes et al. ............... 351/209
2006/0244403 A1 * 11/2006 Christensson et al. ........ 318/280

FOREIGN PATENT DOCUMENTS

JP 2006139593 6/2006

OTHER PUBLICATIONS

Rous et al., "Vision-Based Indoor Scene Analysis for Natural Landmark Detection", Apr. 2005, International Conference on Robotics and Automation, IEEE, Barcelona, Spain.
Cokal et al., "Development of an Image Processing System for a special Purpose Mobile Robot Navigation", 1997, Middle East Technical University Turkey.

* cited by examiner

*Primary Examiner*—Hoa Q Pham
(74) *Attorney, Agent, or Firm*—WPAT, PC; Justin King

(57) ABSTRACT

An anomaly detection system and a method thereof are disclosed. The system comprises at least a light reflecting unit, a light-emitting unit, an image pick-up unit and a processing module. Each of the light reflecting unit is disposed on an object-to-be-detected that all of which are capable of reflecting light emitted from the light-emitting unit and thus cooperatively generating a reflection image relating to the object-to-be-detected to be received by the image pick-up unit for enabling the same to generate an image signal accordingly. The image signal is then transmitted to the processing module where it is analyzed and compared with a standard image signal so as to determine whether the position of the object-to-be-detected is abnormal.

34 Claims, 5 Drawing Sheets

ANOMALY DETECTION SYSTEM AND METHOD

BACKGROUND OF THE INVENTION

1. Field of the Invention

The present invention generally relates to a system and a method for anomaly detection and, more particularly, to a system and a method for determining whether the position of an object-to-be-detected is abnormal by comparing a reflection image with respect to the object-to-be-detected with a standard image.

2. Description of the Prior Art

Conventional security service includes: invasion avoidance, anomaly detection, and emergency notice, of which the operation is activated according to the on-the-spot information, such as information related to a door/window being opened, picked up by sensors disposed in the monitored area. Alternatively, an image pick-up device can also be installed in the monitored area so that the security service personnel can be informed if any anomaly is detected.

Generally, the security service personnel have to go to the monitored area when there is no image pick-up device installed. Therefore, the workload of the security service personnel becomes heavier if the sensors are mal-functional. Moreover, different sensors or smart monitoring devices are required for different purposes so that complicated wiring construction has to be built, which leads to higher cost and restrictions.

Conventionally, for detecting door/window status (being closed/opened), a charge-coupled device is used to pick up gray-scale images to be processed using neural networks to determine whether there is a door and whether the door is opened. Then, a robot passes the door according to the calculation result of the dynamic relative distance of the robot to the door if the door is opened. Alternatively, a method is disclosed for identifying the floor board and the door fringe according to colors and geometrical structure so that a robot can patrol automatically and avoid any obstacle to pass the opened door.

Japan Patent No. 2006-139593 "Detection system, device and method for relative distance and conductors" uses a contactless method by inserting two radio-frequency identification (RFID) tags into two objects. The two RFID tags contact each other to form a short circuit and separate to form an open circuit. An RFID reader reads the relative distance between the two objects. Japan Patent No. 2006-139593 can be realized to obtain the door/window status.

SUMMARY OF THE INVENTION

The present invention provides a system and a method for anomaly detection so as to determine whether the position of an object-to-be-detected is abnormal by comparing a reflection image with respect to the object-to-be-detected with a standard image.

The present invention also provides an anomaly detection system, comprising: at least a light reflecting unit, disposed on at least an object to be detected for detecting the position thereof; a light-emitting unit, capable of emitting light onto the light reflecting unit so as to generate reflected light; an image pick-up unit, capable of picking up the reflected light from the light reflecting unit so as to generate an image signal; and a processing module, electrically connected to the image pick-up unit so as to receive and analyze the image signal and determine whether the image signal is abnormal.

The present invention further provides an anomaly detection method, comprising steps of:

a. disposing at least a light reflecting unit on at least an object to be detected for detecting the position thereof;
b. emitting light from a light-emitting unit onto the light reflecting unit so as to generate reflected light from the light reflecting unit;
c. picking up the reflected light from the light reflecting unit by using an image pick-up unit so as to generate an image signal; and
d. receiving and analyzing the image signal by using a processing module and comparing the image signal with a standard image signal so as to determine whether the image signal is abnormal.

BRIEF DESCRIPTION OF THE DRAWINGS

The objects, spirits and advantages of the embodiments of the present invention will be readily understood by the accompanying drawings and detailed descriptions, wherein.

DETAILED DESCRIPTION OF THE PREFERRED EMBODIMENT

The present invention is exemplified by the preferred embodiment as described hereinafter.

Figure 1:
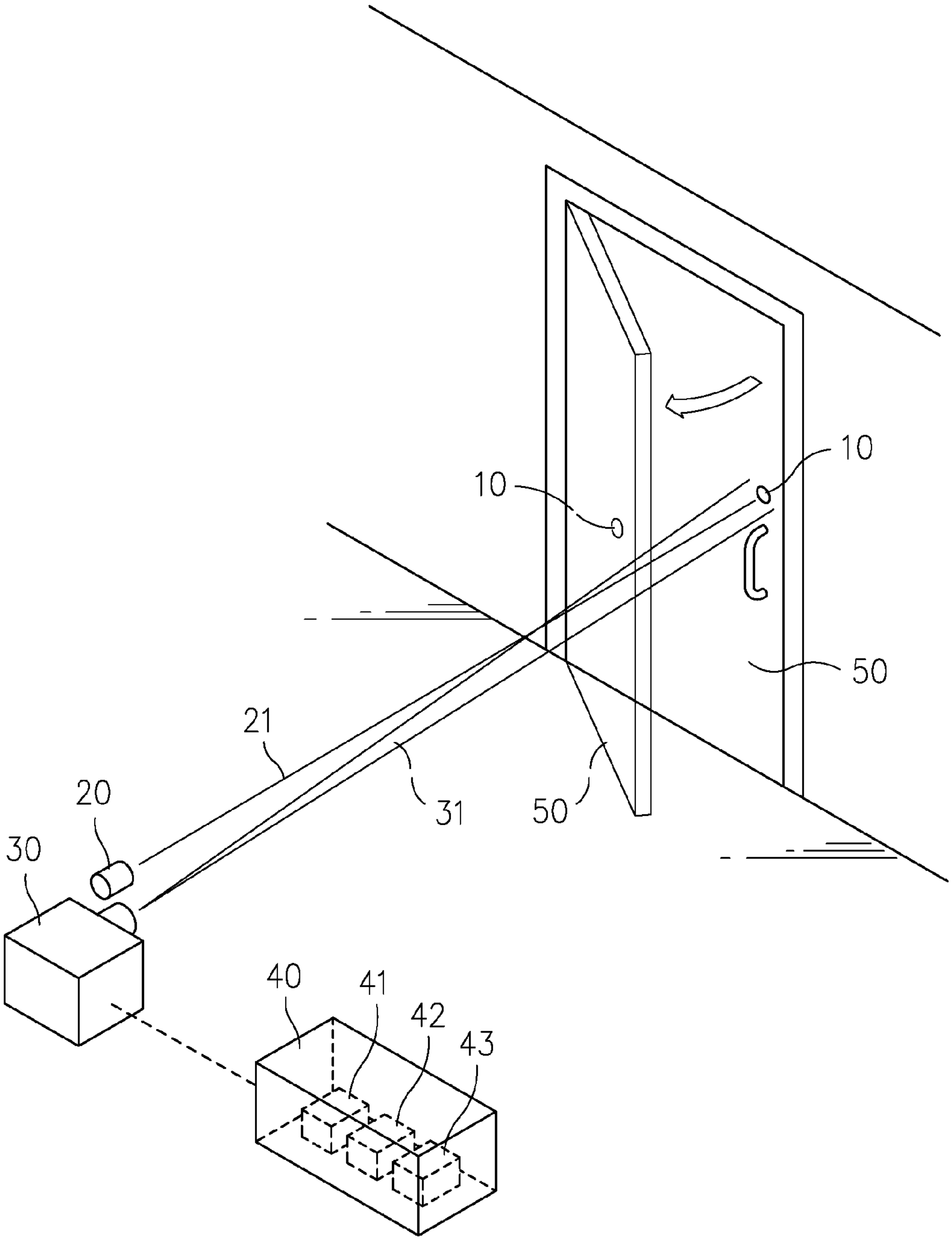
FIG. 1 is a schematic diagram showing an anomaly detection system according to one embodiment of the present invention.

Please refer to FIG. 1, which is a schematic diagram showing an anomaly detection system according to one embodiment of the present invention. The anomaly detection system comprises at least a light reflecting unit 10, a light-emitting unit 20, an image pick-up unit 30 and a processing module 40. The image pick-up unit 30 is electrically connected to the processing module 40 through wired or wireless communication. The light-emitting unit 20 is capable of emitting light continuously according to user's request or is electrically connected to other control units (not shown in the figure) or the processing module 40 so as to control its operation.

The light reflecting unit 10 is disposed on an object to be detected for detecting the position thereof. In FIG. 1, the object is a door 50, on which is disposed a light reflecting unit 10. The light reflecting unit 10 is a light reflecting tag, light reflecting sticker, light reflecting gummed tape, light reflecting mirror, light reflecting paint, or anything that has a good reflectivity higher than the object. The size, shape and number of the light reflecting unit 10 are not limited. In the present embodiment, the light reflecting unit 10 is exemplified by a round reflecting unit 10.

The light-emitting unit 20 is capable of emitting light 21 onto the light reflecting unit 10 so that the light reflecting unit

10 generates reflected light. The image pick-up unit 30 picks up the reflected light from the light reflecting unit 10 so as to generate an image signal. The image signal is transmitted into a processing module 40 for analysis. The pick-up time or time interval of the image pick-up unit 30 can be controlled by manual control or programmable control. In order to focus the light 21 on the light reflecting unit 10 for better reflection, the light-emitting unit 20 can be implemented by using a light-emitting element that exhibits higher light condensation, for example, a project lamp, a light-emitting diode, a halogen lamp, a spotlight, a fluorescent light and a flashlight. The image pick-up unit 30 can be implemented by using a charge-coupled device (CCD), a complementary metal-oxide semiconductor (CMOS), a pan/tilt/zoom (PTZ) camera, and a digital video recorder (DVR). The light from the light-emitting unit 20 can be visible light, infrared rays or near-infrared rays. The image pick-up unit 30 is capable of picking up visible light, infrared rays or near-infrared rays. Therefore, the reflected light from the light reflecting unit 10 and the pick-up region 31 of the image pick-up unit 30 orientate towards the optic axis of the light 21 by adjusting the incident angle of the light from the light-emitting unit 20 onto the light reflecting unit 10 as well as the orientation of the reflection image picked up by the image pick-up unit 30. Accordingly, the image pick-up unit 30 will not pick up other optical spots outside the pick-up region 31 to cause mistakes.

The image pick-up unit 30 generates an image signal after the reflection image is picked up. The image signal is then transmitted to the processing module 40 through wired or wireless communication. The processing module 40 receives and analyzes the image signal. The processing module 40 comprises an image identification unit 41, a storage unit 42 and a comparing unit 43. The image identification unit 41 is capable of identifying the image signal. The storage unit 42 is capable of storing an image signal status. The comparing unit 43 is capable of comparing the image signal with a standard image signal so as to output a comparison result and determine whether there is any anomaly and determine whether the image signal is abnormal.

Figure 2:
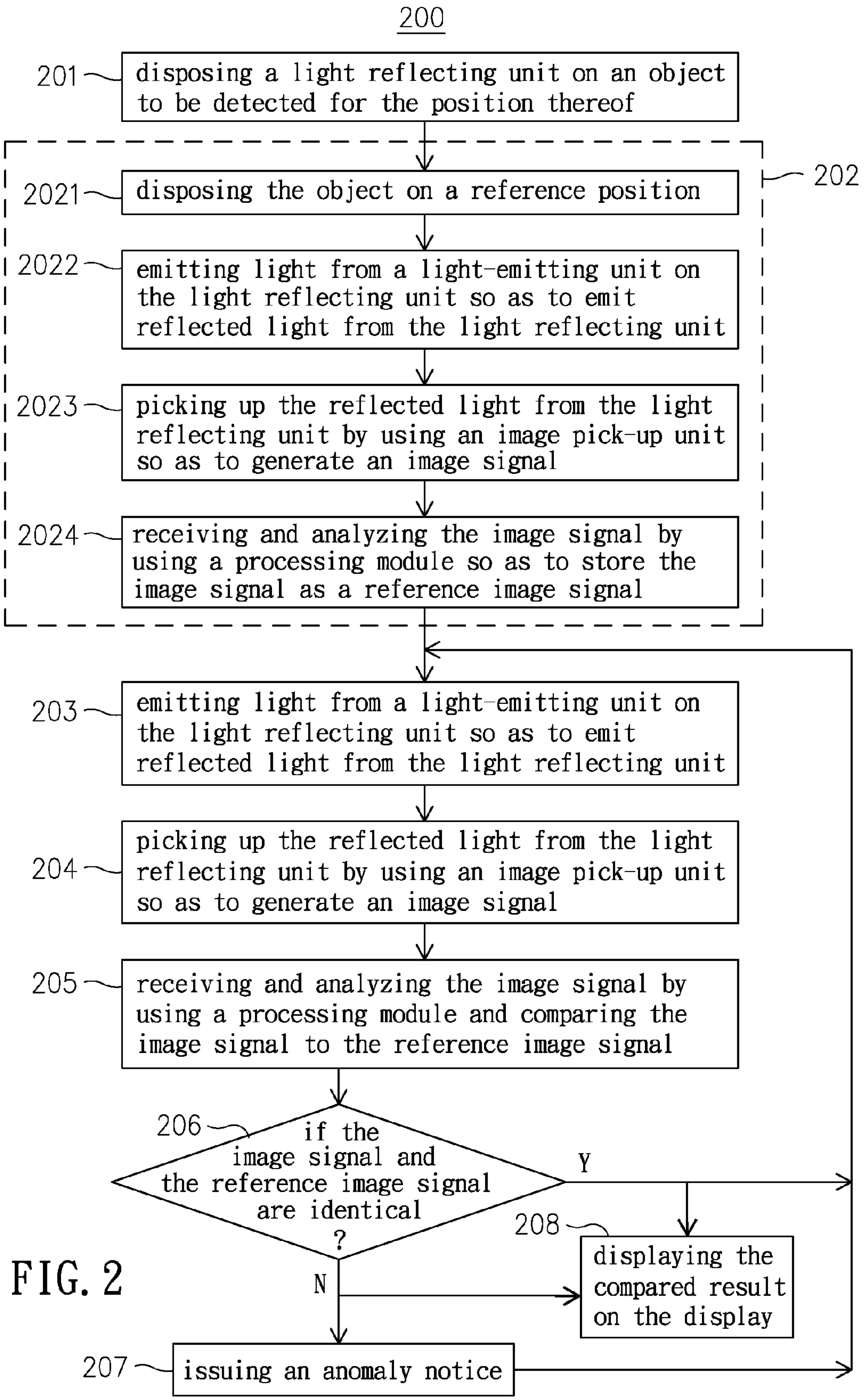
FIG. 2 is a flow-chart showing an anomaly detection method according to one embodiment of the present invention.

Please refer to FIG. 2, which is a flow-chart 200 showing an anomaly detection method according to one embodiment of the present invention.

Step 201: disposing a light reflecting unit on an object to be detected for the position thereof. In FIG. 1, a door 50 is the object to be detected. A light reflecting unit 10 is disposed arbitrarily on the door 50.

Then, a standard image signal setup step 202 is processed so as to setup a standard image signal as a reference for image signal comparison. The standard image signal setup step 202 comprises steps described hereinafter.

Step 2021: disposing the object on a standard position. In FIG. 1, the closed door 50 on which is disposed the light reflecting unit 10 is disposed on a standard position, i.e., a secure position. If the door 50 is opened, it is on an abnormal position, i.e., a dangerous position.

Step 2022: emitting light from a light-emitting unit on the light reflecting unit so as to emit reflected light from the light reflecting unit. In FIG. 1, when the light reflecting unit 10 is disposed properly on the door 50 which is completely closed (on the standard position), the orientation of the light emitting unit 20 is adjusted and the light emitting unit 20 is driven to emit the light 21 incident on the light reflecting unit 10 so that the light reflecting unit 10 generates reflected light.

Step 2023: picking up the reflected light from the light reflecting unit by using an image pick-up unit so as to generate an image signal. Generally, the image pick-up unit 30 has a pick-up region 31. By adjusting the focal length or the distance, the image pick-up unit 30 can pick up part of the image of the door 50 including the region where light reflecting unit 10 is disposed and generate an image signal to be transmitted to the processing module 40.

Step 2024: receiving and analyzing the image signal by using a processing module so as to store the image signal as a standard image signal. In FIG. 1, the processing module 40 comprises an image identification unit 41, a storage unit 42 and a comparing unit 43. The image identification unit 41 identifies the image signal so as to obtain an absolute positional coordinate value of the light reflecting unit 10 and store the absolute positional coordinate value in the storage unit 42. The image picked up by the image pick-up unit 30 is at a secure status when the door 50 is closed. The status is stored so as to setup a standard image signal as a reference for the follow-up monitoring steps.

It is noted that the standard image signal setup step 202 is processed before the follow-up monitoring steps so as to setup a comparison reference. However, a previous setup value can be used as the standard image signal if no change or damage has been made to the system. Under such circumstances, the previous setup value can be input from other input units or control units without the standard image signal setup step 202. Therefore, the user has to make sure that the processing module 40 has stored the standard image signal before the follow-up monitoring steps.

Step 203: emitting light from a light-emitting unit on the light reflecting unit so as to emit reflected light from the light reflecting unit.

Step 204: picking up the reflected light from the light reflecting unit by using an image pick-up unit so as to generate an image signal.

The detailed description for Step 203 and Step 204 is identical to the description for Step 2022 and Step 2023 and is thus omitted.

Step 205: receiving and analyzing the image signal by using a processing module and comparing the image signal to the standard image signal. The image identification unit 41 of the processing module 40 performs identification on the received image signal so as to obtain the absolute positional coordinate value of the light reflecting unit 10. The absolute positional coordinate value is then compared with the absolute positional coordinate value of the stored standard image signal.

Step 206: determining if the image signal and the reference image signal are identical? In FIG. 1, the comparison unit 43 performs the comparison procedure. The procedure returns to Step 203 when the absolute positional coordinate values are identical, indicating that the door 50 is at a secure status where the door 50 is closed. Otherwise, an anomaly notice is issued (Step 207) when the absolute positional coordinate values are not identical, indicating that the door 50 is at an anomaly status where the door 50 is opened. Whatever the comparison result may be, the comparison result is stored in the storage unit 42 and simultaneously displayed on a display unit (Step 208). The display unit is electrically connected to the processing module 40 through wired or wireless communication. Generally, the display unit is a monitor capable of displaying images or texts.

Step 207: issuing an anomaly notice. The anomaly notice can be issued by a display unit as described in Step 208 or conventionally by an alarm bell with a flash warning light. Alternatively, the comparison result can be transmitted through wired or wireless communication to a far end. The processing module 40 can be electrically connected to a communication unit (not shown) so as to transmit the comparison result to the far end through wired or wireless communication.

In addition to the foregoing embodiment wherein a single light reflecting unit 10 is disposed on the door 50, a plurality of light reflecting units 10 can also be disposed on the door 50 in another embodiment. The plurality of light reflecting units 10 forms a regular or an irregular array. The light-emitting unit 20 can be adjusted to emit light 21 incident on all the plurality of light reflecting units 10. The image pick-up unit 30 can pick up the reflection image from door 50 on which are disposed a plurality of light reflecting units 10. The reflection image is transmitted to the processing module 40 and analyzed by the processing module 40. The processing module 40 only analyzes the absolute positional coordinate values of the plurality of light reflecting units 10 because the plurality of light reflecting units 10 are capable of moving synchronously with the door 50. The identification step is identical to that in the case of a single light-reflecting unit 10.

Figure 3:
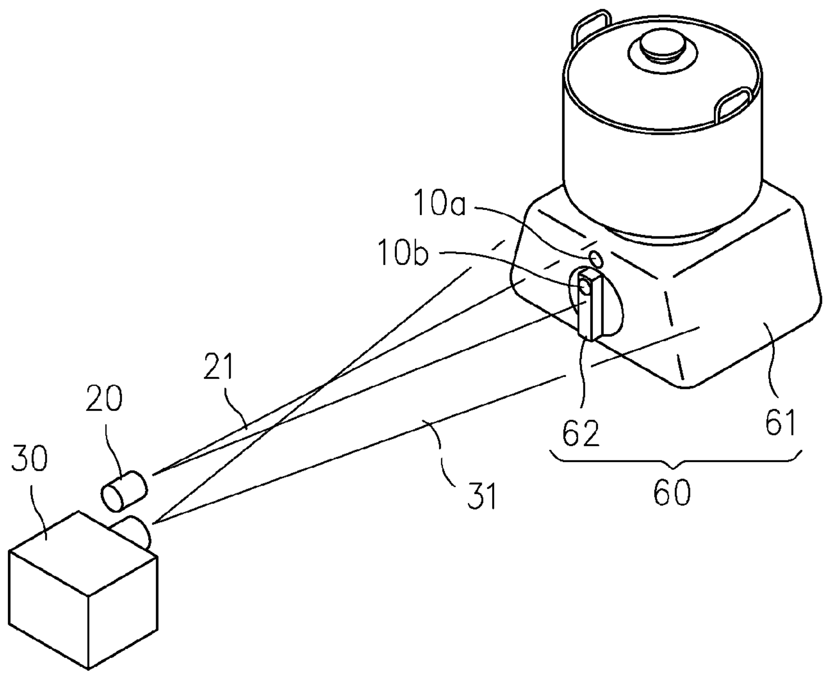
FIGS. 3 and 4 are schematic diagrams showing an anomaly detection system according to another embodiment of the present invention.
Figure 4:
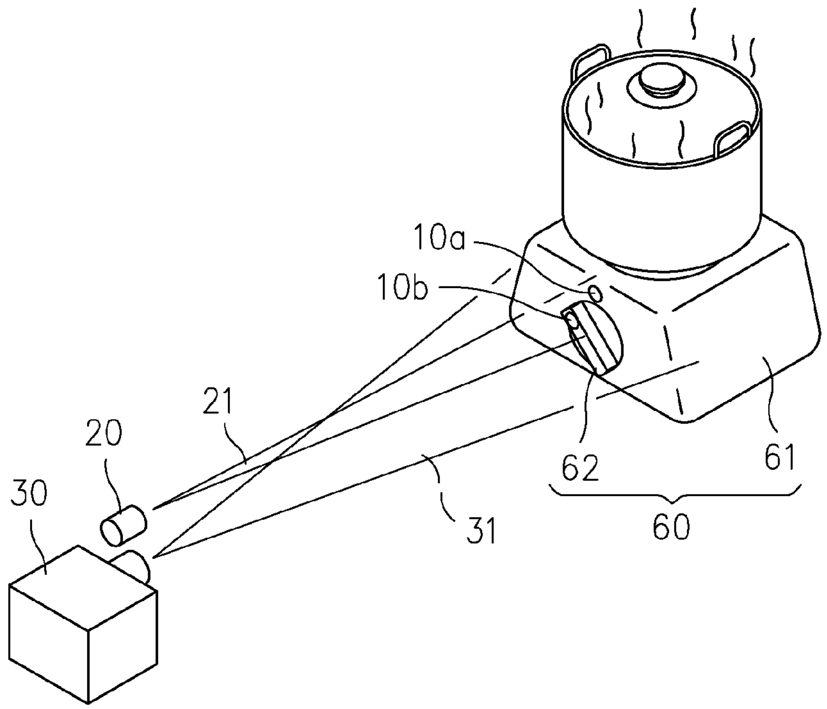

Please refer to FIGS. 3 and 4 for schematic diagrams showing an anomaly detection system according to another embodiment of the present invention. Two light reflecting units 10*a*, 10*b*, a light-emitting unit 20, an image pick-up unit 30 are provided. The image pick-up unit 30 is electrically connected to the processing module 40 as shown in FIG. 1. The function is identical to that in the previous embodiment. The present embodiment is characterized in that the two light reflecting units 10*a*, 10*b*, are disposed on two objects that are relatively movable, for example, the body 61 and the switch 62 of a cooking device 60 in FIGS. 3 and 4. Similarly, the light-emitting unit 20 can be adjusted to emit light 21 incident on both the light reflecting units 10*a*, 10*b*, so as to generate reflected light. The pick-up region 31 of the image pick-up unit 30 is then adjusted so as to pick up the reflection image with respect to the light reflecting units 10, 10*b* when the switch 62 is not on. The reflection image is then transmitted to the processing module 40 (as shown in FIG. 1) for analysis to store as a standard image signal. Since the body 61 and the switch 62 are relatively movable, the processing module 40 analyzes the relative positional coordinate values of the light reflecting units 10a, 10b. In FIG. 4, the light reflecting units 10*a*, 10*b* move relatively when the switch is turned on. Since cooking takes a certain period of time, it is possible that the time for image pick-up is pre-determined so as to monitor the cooking process. When the cooking process exceeds a certain period of time, an anomaly notice will be issued if the relative positional coordinate values of the light reflecting units 10*a*, 10*b* still have not recovered to the positional coordinate values of the standard image signal so that hazard resulting from overheating can be avoided. The switch 62 can also be monitored even when no food is being cooked.

Figure 5:
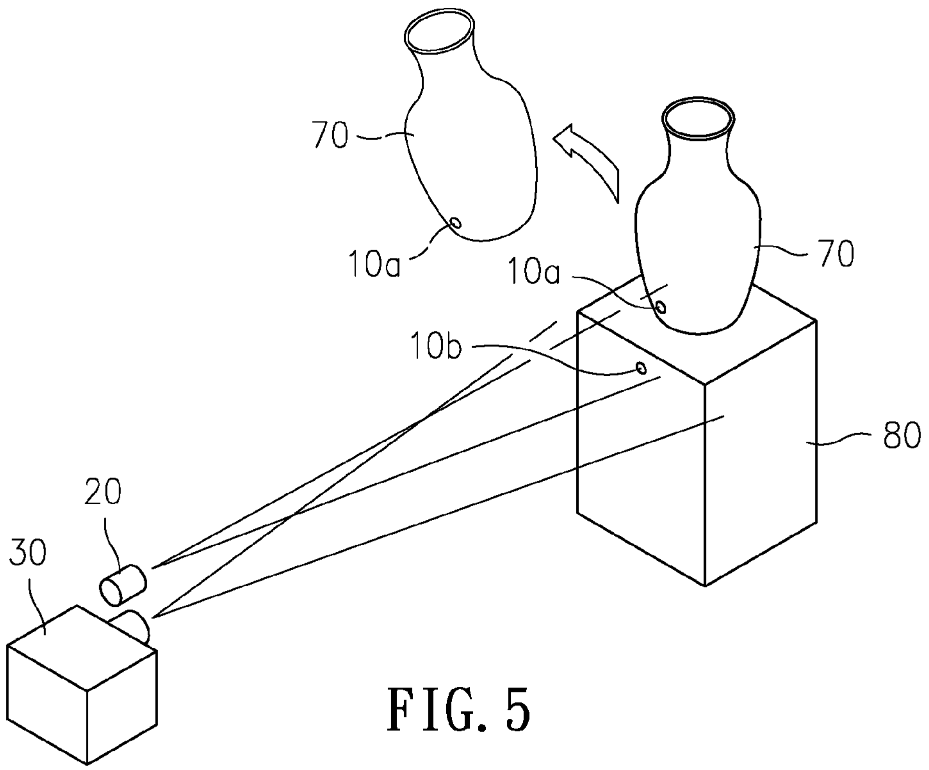
FIGS. 5 and 6 are schematic diagrams showing an anomaly detection system according to still another embodiment of the present invention.
Figure 6:
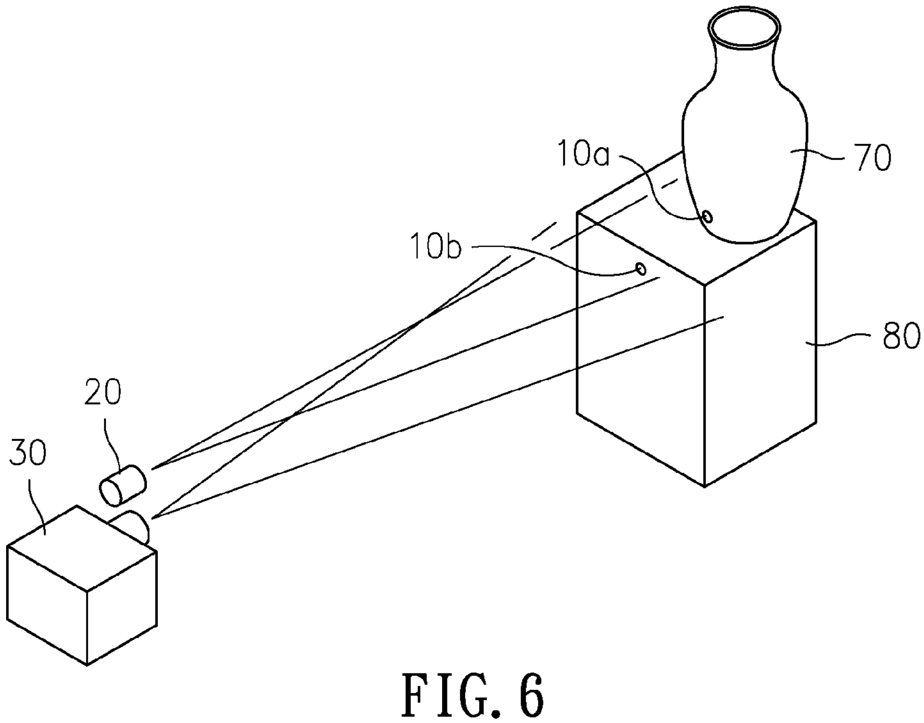

Please further refer to FIGS. 5 and 6 for schematic diagrams showing an anomaly detection system according to still another embodiment of the present invention. Two light reflecting units 10*a*, 10*b*, a light-emitting unit 20 and an image pick-up unit 30 are provided. The image pick-up unit 30 is electrically connected to the processing module 40 as shown in FIG. 1. The function is identical to that described in the previous embodiments. Similarly, the two light reflecting units 10*a*, 10*b* are disposed on two objects that are relatively movable, for example, the vase 70 and the stand 80 in FIGS. 5 and 6. The light-emitting unit 20 can be adjusted to emit light 21 incident on both the light reflecting units 10*a*, 10*b* so as to generate reflected light. The image pick-up unit 30 is then adjusted so as to pick up the reflection image with respect to the light reflecting units 10*a*, 10*b* when the vase 70 is disposed properly on the stand 80. The reflection image is then transmitted to the processing module 40 (as shown in FIG. 1) for analysis to store as a standard image signal. Generally, since the stand 80 is fixedly installed while the vase 70 is movable, the processing module 40 analyzes the relative positional coordinate values of the light reflecting units 10*a*, 10*b*. In FIG. 5, an anomaly notice is issued when the vase 70 is moved from the stand 80 because the light reflecting unit 10*b* has lost its reference relative coordinate and the comparison result is not the same. In FIG. 6, an anomaly notice is issued when the vase 70 is shifted because the relative positional coordinate values of the light reflecting units 10*a*, 10*b* have changed and the comparison result is not the same. The standard image signal can be re-detected when the vase 70 is returned to the secure position.

Figure 7:
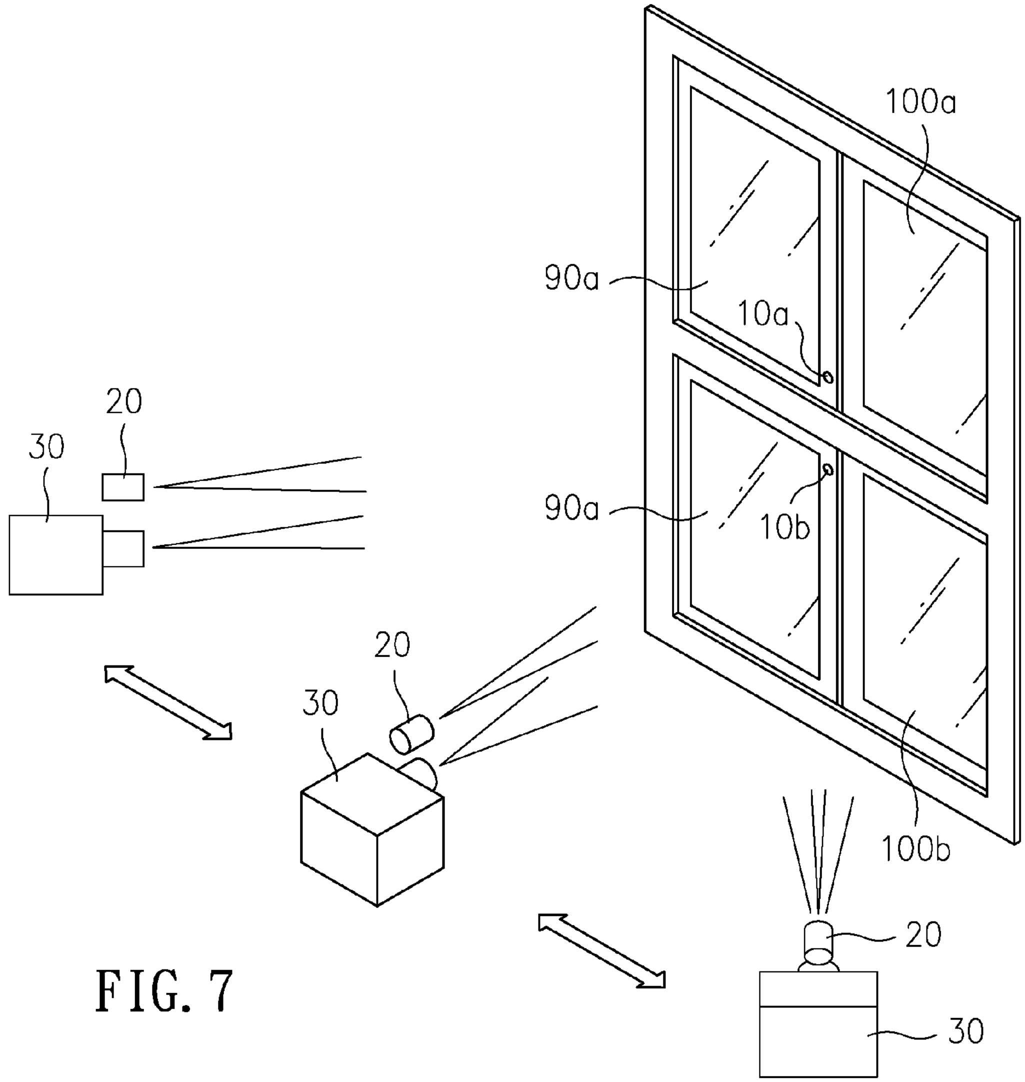
FIG. 7 is a schematic diagram showing a light-emitting unit and an image pick-up unit that are movable according to one embodiment of the present invention.

Please further refer to FIG. 7, which is a schematic diagram showing a light-emitting unit and an image pick-up unit that are movable according to one embodiment of the present invention. The objects to be detected are movable windows 90*a*, 90*b* in coordination with fixed window 100*a*, 100*b*. The light reflecting units 10*a*, 10*b* form a vertical array and are disposed on the movable windows 90*a*, 90*b* respectively. The present embodiment is characterized in that the light-emitting unit 20 and the image pick-up unit 30 are capable of moving horizontally outwards from a central point of the light reflecting units in the vertical array. The relative distance between the light reflecting units 10*a*, 10*b* remains unchanged when the light-emitting unit 20 and the image pick-up unit 30 are moving. Therefore, an anomaly notice is issued when one of the movable windows 90*a*, 90*b* is moved. Otherwise, an anomaly notice is also issued when the movable windows 90*a*, 90*b* are simultaneously moved because the compared result with the absolute positional coordinate values of the stored standard image signal is not the same. The present embodiment is characterized in that the light-emitting unit 20 and the image pick-up unit 30 are capable of moving automatically or remote-controllably.

Figure 8:
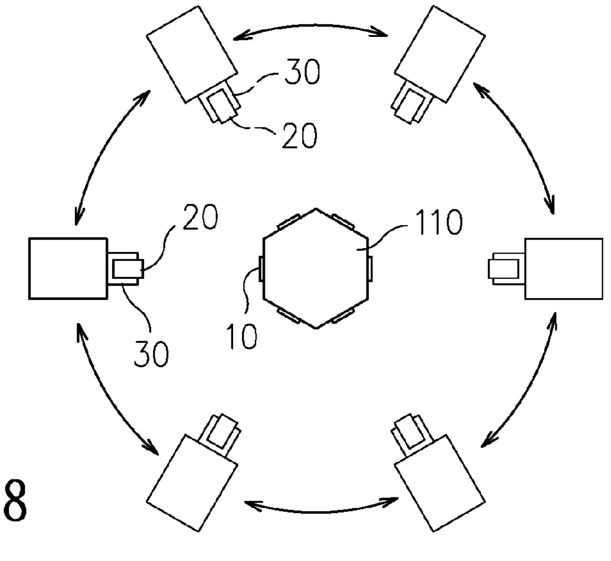
FIG. 8 is a schematic diagram showing a light-emitting unit and an image pick-up unit that are movable according to another embodiment of the present invention.

Similarly, FIG. 8 is a schematic diagram showing a light-emitting unit and an image pick-up unit that are movable according to another embodiment of the present invention. A plurality of light reflecting units 10 are disposed around the object 110 to be detected. The light-emitting unit 20 and the image pick-up unit 30 are capable of moving around the object 110. The light reflecting units 10 can be disposed to form a circle that is concentric with the moving path of the light-emitting unit 20 and the image pick-up unit 30. The light reflecting units 10 in the vertical array can also be disposed to form multiple circles. The light-emitting unit 20 and the image pick-up unit 30 is capable of moving horizontally outwards from a central point of the light reflecting units 10 in the vertical array and circularly around the light reflecting unit. Therefore, the relative distance between the light reflecting units 10 and the object 10 remains unchanged.

Accordingly, the present invention provides a system and a method for anomaly detection so as to determine whether the position of an object-to-be-detected is abnormal by comparing a reflection image with respect to the object-to-be-detected with a standard image. It is applicable to security monitoring and protection with simplified image processing complexity for real-time monitoring of environmental images through remote control from a far end. The system of the present invention is simple, low-cost and easy to install and setup so that it is applicable to security monitoring and protection. It is noted that the position, arrangement and number of the light reflecting units, the positions of the light-emitting unit, image pick-up unit as well as the setup of the initial standard image signal are not limited and can be modified according to practical uses.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. An anomaly detection system, comprising:

at least a light reflecting unit, disposed on at least an object to be detected for detecting the position thereof;

a light-emitting unit, capable of emitting light onto the light reflecting unit so as to generate reflected light;

an image pick-up unit, capable of picking up the reflected light from the light reflecting unit so as to generate an image signal; and a processing module, electrically connected to the image pick-up unit so as to receive and analyze the image signal and determine whether the image signal is abnormal.

2. The anomaly detection system as recited in claim 1, wherein the light from the light-emitting unit has an optic axis, towards which the reflected light from the light reflecting unit and a reflection image with respect to the reflected light picked up by the image pick-up orientate.

3. The anomaly detection system as recited in claim 1, wherein the light reflecting units form a regular array or an irregular array.

4. The anomaly detection system as recited in claim 1, wherein there are a plurality of light reflecting units on one object.

5. The anomaly detection system as recited in claim 1, wherein there is at least a light reflecting unit on each of a plurality of objects.

6. The anomaly detection system as recited in claim 1, wherein the plurality of light reflecting units form a vertical array.

7. The anomaly detection system as recited in claim 6, wherein the image pick-up unit is capable of moving horizontally.

8. The anomaly detection system as recited in claim 7, wherein the light-emitting unit is capable of moving synchronously with the image pick-up unit.

9. The anomaly detection system as recited in claim 1, wherein the light reflecting unit has a higher reflectivity than the object on which the light reflecting unit is disposed.

10. The anomaly detection system as recited in claim 1, wherein the image pick-up unit is automatically movable or remote-controllably movable so as to pick up images by manual control or programmable control.

11. The anomaly detection system as recited in claim 1, wherein the image pick-up unit is capable of transmitting the image signal to the processing module through wired or wireless communication.

12. The anomaly detection system as recited in claim 1, wherein the light from the light-emitting unit is infrared rays or near-infrared rays and the image pick-up unit is capable of reading infrared rays or near-infrared rays.

13. The anomaly detection system as recited in claim 1, wherein the processing module comprises:

an image identification unit, capable of identifying the image signal;

a storage unit, capable of storing an image signal status;

a comparing unit, capable of comparing the image signal with a standard image signal so as to output a comparison result and determine whether there is any anomaly.

14. The anomaly detection system as recited in claim 13, wherein the processing module is electrically connected to a display unit for displaying the comparison result.

15. The anomaly detection system as recited in claim 13, wherein the processing module is electrically connected to a communication unit for transmitting the comparison result to a far end.

16. An anomaly detection method, comprising steps of:

a. disposing at least a light reflecting unit on at least an object to be detected for detecting the position thereof;

b. emitting light from a light-emitting unit onto the light reflecting unit so as to generate reflected light from the light reflecting unit;

c. picking up the reflected light from the light reflecting unit by using an image pick-up unit so as to generate an image signal; and d. receiving and analyzing the image signal by using a processing module and comparing the image signal with a standard image signal so as to determine whether the image signal is abnormal.

17. The anomaly detection method as recited in claim 16, further comprising a standard image signal setup step after step a, the standard image signal setup step comprising steps of:

disposing the object on a standard position;

performing step b and step c;

receiving and analyzing the image signal by using the processing module and storing the image signal as the standard image signal.

18. The anomaly detection method as recited in claim 16, wherein the light from the light-emitting unit has an optic axis, towards which the reflected light from the light reflecting unit and a reflection image with respect to the reflected light picked up by the image pick-up unit orientate.

19. The anomaly detection method as recited in claim 16, wherein the processing module analyzes the image signal so as to obtain an absolute positional coordinate value of the light reflecting unit when there is one light reflecting unit on one object.

20. The anomaly detection method as recited in claim 16, wherein the processing module analyzes the image signal so as to obtain absolute positional coordinate values or relative positional coordinate values of the light reflecting units when there are a plurality of light reflecting units on one object.

21. The anomaly detection method as recited in claim 16, wherein the processing module analyzes the image signal so as to obtain relative positional coordinate values of the light reflecting units when there is at least a light reflecting unit on each of a plurality of objects.

22. The anomaly detection method as recited in claim 16, wherein the light reflecting units form a regular array or an irregular array.

23. The anomaly detection method as recited in claim 16, wherein the plurality of light reflecting units form a vertical array.

24. The anomaly detection method as recited in claim 23, wherein the image pick-up unit is capable of moving horizontally outwards from a central point of the light reflecting units in the vertical array.

25. The anomaly detection method as recited in claim 24, wherein the light-emitting unit is capable of moving synchronously with the image pick-up unit.

26. The anomaly detection method as recited in claim 23, wherein the image pick-up unit is capable of moving horizontally outwards from a central point of the light reflecting units in the vertical array and circularly around the light reflecting unit.

27. The anomaly detection method as recited in claim 26, wherein the light-emitting unit is capable of moving synchronously with the image pick-up unit.

28. The anomaly detection method as recited in claim 16, wherein the light reflecting unit has a higher reflectivity than the object on which the light reflecting unit is disposed.

29. The anomaly detection method as recited in claim 16, wherein the image pick-up unit is movable or rotatable automatically or remote-controllably movable so as to pick up images by manual control or programmable control.

30. The anomaly detection method as recited in claim 16, wherein the image pick-up unit is capable of transmitting the image signal to the processing module through wired or wireless communication.

31. The anomaly detection method as recited in claim 16, wherein the light from the light-emitting unit is infrared rays or near-infrared rays and the image pick-up unit is capable of reading infrared rays or near-infrared rays.

32. The anomaly detection method as recited in claim 16, wherein the processing module comprises:

an image identification unit, capable of identifying the image signal;

a storage unit, capable of storing an image signal status;

a comparing unit, capable of comparing the image signal with a standard image signal so as to output a comparison result and determine whether there is any anomaly.

33. The anomaly detection method as recited in claim 16, wherein the processing module is electrically connected to a display unit for displaying the comparison result.

34. The anomaly detection method as recited in claim 16, wherein the processing module is electrically connected to a communication unit for transmitting the comparison result to a far end.

* * * * *